United States Patent [19]

Uhlianuk

[11] Patent Number: 5,407,976
[45] Date of Patent: Apr. 18, 1995

[54] ISOCYANATE CROSSLINKED MICROGEL FOR CATHODIC ELECTROCOATING COMPOSITIONS

[75] Inventor: Peter W. Uhlianuk, Romeo, Mich.

[73] Assignee: E. I. Du Pont de Nemours and Company, Wilmington, Del.

[21] Appl. No.: 141,185

[22] Filed: Oct. 27, 1993

[51] Int. Cl.6 .......................... C08K 3/20; C08L 63/02
[52] U.S. Cl. ...................................... 523/415; 523/417
[58] Field of Search ........................ 523/414, 415, 417

[56] References Cited

U.S. PATENT DOCUMENTS

| | | | |
|---|---|---|---|
| 3,976,615 | 8/1976 | Sekmakas | 260/29.6 HN |
| 4,129,490 | 12/1978 | Schimmel | 204/181 C |
| 4,170,579 | 10/1979 | Bosso et al. | 260/29.2 TN |
| 4,525,260 | 6/1985 | Abbey et al. | 204/181.7 |
| 4,788,246 | 11/1988 | Tsuchiya et al. | 524/554 |
| 4,987,178 | 1/1991 | Shibata et al. | 524/547 |
| 5,096,556 | 3/1992 | Corrigan et al. | 204/181.7 |
| 5,135,970 | 8/1992 | Hönel et al. | 523/414 |
| 5,171,764 | 12/1992 | Katayama et al. | 523/201 |

Primary Examiner—Melvyn I. Marquis
Assistant Examiner—D. Aylward
Attorney, Agent, or Firm—Hilmar L. Fricke

[57] ABSTRACT

A cationic finely divided polymeric microgel dispersed in an aqueous medium for use in cationic electrocoating compositions which is a polyamine reaction product having reactive amine and hydroxyl groups and is the reaction product of a polyepoxy hydroxy polymer and an amine compound from the group of ketimines, primary amines, secondary amines or any mixtures thereof: the polyepoxy amine reaction product is reacted with an oxime blocked polyisocyanate under temperature conditions sufficient to deblock the polyisocyanate thereby providing reactive isocyanate groups which react with the amine groups and hydroxyl groups of the polyamine reaction to form a crosslinked microgel; residual amine groups of the microgel are neutralized with an organic acid to form cationic groups that are water dispersible. A process for forming the microgel and cationic electrocoating compositions containing the microgel are included.

13 Claims, No Drawings

ISOCYANATE CROSSLINKED MICROGEL FOR CATHODIC ELECTROCOATING COMPOSITIONS

BACKGROUND OF THE INVENTION

This invention is directed to microgels and in particular to microgels that are useful in cathodic electrocoating compositions.

The coating of electrically conductive substrates by an electrodeposition process (also called an electrocoating process) is a well known and important industrial process. Electrodeposition of primers to automotive substrates is widely used in the automotive industry. In this process, a conductive article, such as an autobody or an auto part, is immersed in a bath of a coating composition of an aqueous emulsion of film forming polymer and acts as an electrode in the electrodeposition process. An electric current is passed between the article and a counter-electrode in electrical contact with the aqueous emulsion, until a coating having the desired thickness is deposited on the article. In a cathodic electrocoating process, the article to be coated is the cathode and the counter-electrode is the anode.

Resin compositions used in the bath of a typical cathodic electrodeposition process also are well known in the art. These resins typically are made from polyepoxide resins which have been chain extended and then an adduct is formed to include amine groups in the resin. Amine groups typically are introduced through reaction of the resin with an amine compound. These resins are blended with a crosslinking agent and then neutralized with an acid to form a water emulsion which is usually referred to as a principal emulsion.

The principal emulsion is combined with a pigment paste, coalescent solvents, water, and other additives to form an electrocoating bath. The electrocoating bath is placed in an insulated tank containing the anode. The article to be coated is the cathode and is passed through the tank containing the electrocoating bath. The thickness of the coating that is deposited on the article being electrocoated is a function of the bath characteristics, the electrical operating characteristics, the immersion time, and the like.

The resulting coated article is removed from the bath after a set period of time and is rinsed with deionized water. The coating on the article is cured typically in an oven at sufficient temperature to produce a crosslinked finish on the article.

Cathodic electrocoating compositions, resin compositions, coating baths, and cathodic electrodeposition processes are disclosed in Jerabek et al U.S. Pat. Nos. 3,922,253 issued Nov. 25, 1975; Wismer et al 4,419,467 issued Dec. 6, 1983; Belanger 4,137,140 issued Jan. 30, 1979, Wismer et al 4,468,307 issued Aug. 25, 1984 and DebRoy et al 5,070,149 issued Dec. 3, 1991.

The use of cationic microgels in cathodic electrocoating compositions is known to solve problems of improving edge coverage and reducing edge corrosion as shown in Abbey et al U.S. Pat. Nos. 4,525,260 issued Jun. 25, 1985, Tsuchiya et al 4,788,246 issued Nov. 29, 1988, Shibata et al 4,987,178 issued Jan. 22, 1991 and Corrigan et al 5,096,556 issued Mar. 17, 1992.

However, Abbey et al and Shibata et al are both directed to acrylic polymer based microgels and Tsuchiya et al is directed to a polybutadiene based microgel. Microgels based on acrylic polymers or butadiene polymers adversely affect the general corrosion protection of coatings formed from cathodic electrocoating compositions. The microgel of this invention does not reduce the general corrosion protection of coatings formed from cathodic electrocoating compositions in comparison to the composition of the prior art. Corrigan et al forms microgels based on epoxy resins but uses a different and less efficient synthesis for forming microgels and forms microgels having a different chemical structure from those of the invention.

SUMMARY OF THE INVENTION

A cationic finely divided polymeric microgel dispersed in an aqueous medium for use in cationic electrocoating compositions which is a polyamine reaction product having reactive amine and hydroxyl groups and is the reaction product of a polyepoxy hydroxy polymer and an amine compound from the group of ketimines, primary amines, secondary amines or any mixtures thereof; the polyepoxy amine reaction product is reacted with an oxime blocked polyisocyanate under temperature conditions sufficient to deblock the polyisocyanate thereby providing reactive isocyanate groups which react with the amine groups and hydroxyl groups of the polyamine reaction to form a crosslinked microgel; residual amine groups of the microgel are neutralized with an organic acid to form cationic groups that are water dispersible.

A process for forming the microgel and cationic electrocoating compositions containing the microgel also are a part of this invention.

DETAILED DESCRIPTION OF THE INVENTION

The microgel of this invention when added to a conventional electrocoating composition improves the edge corrosion of the electrocoating composition and provides thicker edge coverage in comparison to conventional electrocoating compositions that do not contain microgel. The microgel does not adversely affect other properties of the electrocoating composition such as its overall corrosion protection. The microgel can be added directly to an electrocoating tank containing an epoxy based composition and need not be formulated with the coating composition. The microgel usually is added to the electrocoating composition in amounts of about 10–40% by weight and preferably 25–35% by weight, based on the weight of the binder of the coating composition, to achieve these improved results.

The microgel is prepared by reacting a poly epoxy hydroxy polymer with an amine compound which may be either a ketimine, primary amine, secondary amine or any mixtures thereof to form a poly epoxy amine reaction product that has reactive amine and hydroxy groups. This product is mixed with an oxime blocked polyisocyanate and with an organic acid in water and a surfactant and reacted under temperature conditions sufficient to unblock isocyanate groups of the blocked polyisocyanate. Generally temperatures of about 40°–80° C. are used for about 2–6 hours. A portion of the amine and hydroxy groups of the reaction product are reacted with an organic acid in water and cationic groups that are dispersible in water are formed. The isocyanate groups are unblocked and then react with the hydroxy and amine groups of the polyepoxy amine reaction product to form a crosslinked microgel that is dispersed in water.

If a ketimine is used to form the poly epoxy amine reaction product, upon the addition of an aqueous acid solution the ketimine reacts with water to form amine groups which react with the deblocked isocyanate groups a crosslinked polymeric microgel.

The poly epoxy hydroxy polymer used to form the microgel can be any epoxy hydroxy containing polymer having a 1,2 epoxy equivalency of two or more such as a linear epoxy hydroxy functional polymer containing acrylic segment of polymerized acrylic monomers such as alkyl acrylate monomers, alkyl methacrylate monomers or mixtures thereof, urethane segments and the like; branched polyepoxides which can be aromatic or aliphatic such as bis phenol A containing polymers and polymers containing acrylic segments of polymerized acrylic monomers or urethane segments.

It is preferred to use epoxy terminated polyepoxy hydroxy ether resins to form the microgel that have a 1,2-epoxy equivalency of about two or more, that is, polyepoxides which have on an average basis two or more epoxy groups per molecule. The preferred polyepoxides are polyglycidyl ethers of cyclic polyols. Particularly preferred are polyglycidyl ethers of polyhydric phenols such as bisphenol A. These polyepoxides can be produced by etherification of polyhydric phenols with epihalohydrin or dihalohydrin such as epichlorohydrin or dichlorohydrin in the presence of alkali. Examples of polyhydric phenols are 2,2-bis-(4-hydroxyphenyl)ethane, 2-methyl-1,1-bis-(4-hydroxyphenyl)propane, 2,2-bis-(4-hydroxy-3-tertiarybutylphenyl)propane, 1,1-bis-(4-hydroxyphenol)ethane, bis-(2-hydroxynaphthyl)methane, 1,5-dihydroxy-3-naphthalene or the like.

Besides polyhydric phenols, other cyclic polyols can be used in preparing the polyglycidyl ethers of cyclic polyol derivatives. Examples of other cyclic polyols are alicyclic polyols, particularly cycloaliphatic polyols, such as 1,2-bis(hydroxymethyl)cyclohexane, 1,3-bis-(hydroxymethyl)cyclohexane, 1,2 cyclohexane diol, 1,4 cyclohexane diol and hydrogenated bisphenol A.

The polyepoxides have molecular weights of at least 200 and preferably within the range of 200 to 3000, and more preferably about 340 to 2000.

The polyepoxides can be chain extended with a polyether or a polyester polyol which enhances flow and coalescence. Typical useful chain extenders are polyols such as polycaprolactone diols such as Tone 200 ® series available from Union Carbide Corporation, polyoxypropylene diamine such as Jeffamine D-2000 ® having a molecular weight of about 2000 available from Texaco Chemical Company and ethyoxylated Bisphenol A such as SYNFAC 8009 ® available from Milliken Chemical Company.

Examples of polyether polyols and conditions for chain extension are disclosed in U.S. Pat. No. 4,468,307. Examples of polyester polyols for chain extension are disclosed in Marchetti et al U.S. Pat. No. 4,148,772 issued Apr. 10, 1979.

Typical catalysts that are used in the formation of these polyepoxides are tertiary amines such as dimethyl benzyl amine and organometallic complex's such as triphenyl phosphonium iodide.

Ketimines useful in this invention are formed from ketones and primary amines. The water formed is removed, for example, by azeotropic distillation. Useful ketones include dialkyl, diaryl and alkylaryl ketones having 3-13 carbons atoms. Specific examples include acetone, methyl ethyl ketone, methyl n-butyl ketone, methyl isobutyl ketone, methyl isoamyl ketone, methyl aryl ketone, ethyl isoamyl ketone, ethyl amyl ketone, acetophenone, and benzophenone. Suitable diamines are ethylene diamine, 1,3-diamopropane, 1,4-diaminobutane, 1,6-diaminohexane, 4,9-dioxadodecone, 1,12-diamine and the like. One typically useful ketimine is diketimine which is the ketimine of diethylene triamine and methyl isobutyl ketone.

Typically useful primary and secondary amines are diethyl amine, methyl ethyl amine, methyl ethanol amine, ethyl ethanol amine, mono ethanol amine, ethyl amine, dimethyl amine, diethyl amine, propyl amine, dipropyl amine, isopropyl amine, diisopropyl amine, butyl amine, dibutyl amine and the like. Alkanol amine such as methyl ethanol amine are preferred.

The blocked polyisocyanates used to form the crosslinked microgel particles is stable up to about 70° C. and unblocks in the range of about 70°-100° C. Blocked polyisocyanates which deblock below 70° C. often are difficult to prepare, store and handle. The upper limit of 100° C. is determined by the boiling point of the aqueous emulsion. The isocyanate must deblock below the boiling point of the emulsion.

Aromatic polyisocyanates are preferred since they are more reactive than aliphatic polyisocyanates and work best to crosslink the polymeric particles to form a crosslinked microgel. Typically useful polyisocyanates include toluene diisocyanate or adducts thereof, diphenyl methylene bis diisocyanate and the like. Polyisocyanate adducts also can be used such as an adduct of trimethylol propane or triethylol propane and methylene bis diisocyante or toluene diisocyanate. Trimers, biurets and isocyanurates also can be used.

Oxime blocking agents used to block the polyisocyanate typically are acetone oxime, methyl ethyl ketoxime and methyl propyl ketoxime and are preferred because of their reactivity. Other useful oximes are methylisobutyl ketoxime and methyl amyl ketoxime.

Typical acids used to neutralize the hydroxy and amino groups of the resin to form cationic groups which are water dispersible are sulfamic acid, lactic acid, acetic acid and formic acid.

The microgel particles in dispersion having a particle size of 0.01 to 6 microns determined by a Coulter Model LS150 Automated Laser Based Particle Size Analyzer made by Coulter Scientific Instruments.

A surfactant may be used in an amount of up to 5% by weight of the microgel in the composition to keep the particles dispersed. Typically useful surfactants are described hereinafter.

The microgel is designed for use in aqueous cathodic electrocoating compositions but could be used in other waterbased compositions such as aqueous latexes and enamels.

Typical aqueous cationic electrocoating compositions are shown in DebRoy et al U.S. Pat. No. 5,070,149 issued Dec. 3, 1991 and the aforementioned U.S. Pat. Nos. 3,922,253, 4,419,467, 4,137,140 and 4,468,307.

These cationic electrocoating compositions typically contain a cationic resinous binder of an epoxy/amine adduct and a blocked isocyanate crosslinking agent dispersed in an aqueous medium and the binder is present in amounts of about 30-50% by weight of solids.

Besides the ingredients described above, the electrocoating composition usually contains a pigment which is incorporated into the composition in the form of a paste. The pigment paste is prepared by grinding or dispersing a pigment into a grinding vehicle and optional ingredients such as wetting agents, surfactants, and defoamers. Pigment grinding vehicles are well known in the art. After grinding, the particle size of the pigment should be as small as practical, generally, a Hegman grinding gauge of about 6 to 8 is usually employed.

Pigments which can be employed in the practice of the invention include titanium dioxide, basic lead silicate, strontium chromate, carbon black, iron oxide, clay and so forth. Pigments with high surface areas and oil absorbencies should be used judiciously because they can have an undesirable effect on coalescence and flow.

The pigment-to-resin weight ratio is also important and should be preferably less than 50:100, more preferably less than 40:100, and usually about 20 to 40:100. Higher pigment-to-resin solids weight ratios also have been found to adversely affect coalescence and flow.

The electrocoating compositions of the invention can contain optional ingredients such as wetting agents, surfactants, defoamers and the like. Examples of surfactants and wetting agents include alkyl imidazolines such as those available from Ciba-Geigy Industrial Chemicals as Amine C ®, acetylenic alcohols available from Air Products and Chemicals as Surfynol 104 ®. These optional ingredients, when present, constitute from about 0 to 20 percent by weight of resin solids. Plasticizers promoting flow are optional ingredients. Examples of plasticizers are high boiling water immiscible materials such as ethylene or propylene oxide adducts of nonyl phenols or bisphenol A. Plasticizers can be used at levels of up to about 15 percent by weight resin solids.

Curing catalysts such as tin catalysts are usually present in the composition. Examples are dibutyltin dilaurate and dibutyltin oxide. When used, they are typically present in amounts of about 0.05 to 2 percent by weight tin, based on weight of total resin solids.

The electrocoating compositions of this invention are dispersed in aqueous medium. The term "dispersion" as used within the context of the present invention is believed to be a two-phase translucent or opaque aqueous resinous system in which the resin is in the dispersed phase and water the continuous phase. The average particle size diameter of the resinous phase is about 0.1 to 10 microns, preferably less than 5 microns. The concentration of the resinous products in the aqueous medium is, in general, not critical, but ordinarily the major portion of the aqueous dispersion is water. The aqueous dispersion usually contains from about 3 to 50 percent preferably 5 to 40 percent by weight resin solids. Aqueous resin concentrates which are to be further diluted with water, generally range from 10 to 30 percent by total weight solids.

Besides water, the aqueous medium may also contain a coalescing solvent. Useful coalescing solvents include hydrocarbons, alcohols, esters, ethers and ketones. The preferred coalescing solvents include alcohols, polyols and ketones. Specific coalescing solvents include monobutyl and monohexyl ethers of ethylene glycol, and phenyl ether of propylene glycol. The amount of coalescing solvent is not unduly critical and is generally between about 0 to 15 percent by weight, preferably about 0.5 to 5 percent by weight based on total weight of the resin solids.

In the electrocoating process, a film is electrodeposited on a metal substrate using a voltage of about 50 to 500 volts and the resulting film is baked at about 120° to 250° C. for about 10 to 60 minutes to form a film about 15 to 60 microns in thickness.

The following examples illustrate the invention. All parts and percentages are on a weight basis unless otherwise specified.

EXAMPLES

Example 1

A microgel was prepared by first forming a solution of a blocked toluene diisocyanate (TDI) by charging the following constituents into a reactor equipped with a heat source, a thermometer and a stirrer:

| | Parts by Weight |
|---|---|
| Toluene diisocyanate | 870.0 |
| Methylethyl ketoxime blocking agent | 957.0 |
| Methyl isobutyl ketone | 435.0 |
| Total | 2262.0 |

The toluene diisocyanate was charged into the reactor under a blanket of nitrogen and heated to 71.1° C. with constant agitation. Methylethyl ketoxime was added at a uniform rate over a 75 minute period and held at the above temperature for 45 minutes. A sample of the resulting composition was analyzed using a Perkin Elmer model #1330 infrared spectrometer. The complete absence of the —NCO peak at (2200 cm$^{-1}$) in an infrared absorbance spectrum indicated that —NCO was not present and the blocked isocyanate was formed. The resulting blocked toluene diisocyanate solution had a solids content of about 76.6%.

A microgel was prepared by charging the following constituents into a reactor equipped with a reflux condenser, heat source, a stirrer and a thermometer:

| | Parts by Weight |
|---|---|
| Portion 1 | |
| Epon 828 ® - epoxy resin of diglycidyl ether of Bisphenol A from Shell Chemical Company having an equivalent weight of 188 | 1255.0 |
| Bisphenol A | 599.6 |
| Xylene | 909.0 |
| Triphenyl phosphonium iodide | 1.8 |
| Portion 2 | |
| Methyl isobutyl ketone | 705.0 |
| Methylethanol amine | 82.6 |
| Diethylene triamine | 32.0 |
| Portion 3 | |
| Methylethyl ketoxime blocked TDI solution (prepared above) | 642.7 |
| Portion 4 | |
| Glacial acetic acid | 85.2 |
| Surfactant - 120 parts Amine C ® from Ciba Geigy Inc., 120 parts acetylenic alcohol available as Surfynol 104 ® from Air Products and Chemicals, Inc., 120 parts of 1-butoxy ethanol, 221 parts of deionized water and 19 parts glacial acetic acid | 50.0 |
| Deionized water | 4806.1 |
| Total | 8300.0.1 |

Portion 1 was charged into the reaction vessel heated to about 143.3° C. under a blanket of nitrogen with constant stirring. An exothermic reaction occurred and the temperature rose to about 201.6° C. The reaction mixture was held at about 171.1° C. for about 75 minutes The resulting the epoxy resin was extended and has an epoxy equivalent weight of about 1315. The reaction mixture was cooled to about 121.1° C. and the viscosity was reduced by adding the methyl isobutyl ketone of Portion 2. The reaction mixture cooled to about 87.7° C. and the methyl ethanolamine of Portion 2 was added and the reaction mixture was held for 60 minutes and then the diethylene triamine of Portion 2 was added and held for an additional 30 minutes. The reaction mixture was cooled to 76.6° C. and Portion 3 was added with stirring and held for about 5 minutes. Portion 4 was premixed and charged into a mixer and the above prepared reaction mixture was added using sufficient shear to form a good emulsion. The resulting emulsion was heated to about 76.6° C. and agitated for about 7 hours to allow for the formation of microgel particles and crosslinking to occur in the microparticles.

The resulting microgel emulsion had a solids content of about 30.62%. 71.5% of the nonvolatiles are insoluble crosslinked microparticles determined by a 7 hour extraction by refluxing tetrahydrofuran. The particle size of the emulsion was determined as described above and was 0.097 microns.

Example 2

A microgel was prepared by first forming a solution of a blocked diphenylmethane 4,4'diisocyanate (MDI) by charging the following constituents into a reactor equipped with a heat source, a thermometer and a stirrer:

|  | Parts by Weight |
| --- | --- |
| Diphenylmethane 4,4' diisocyanate (MDI) | 162.4 |
| Acetone oxime blocking agent | 116.8 |
| Methyl isobutyl ketone | 435.0 |
| Total | 396.5 |

The MDI was charged into the reactor under a blanket of nitrogen and heated to 79° C. with constant agitation. Acetone oxime was added at a uniform rate over a 45 minute period and held at the above temperature for 30 minutes. A sample of the resulting composition was analyzed using a Perkin Elmer model #1330 infrared spectrometer. The complete absence of the —NCO peak at (2200 cm$^{-1}$) in an infrared absorbance spectrum indicated that —NCO was not present and the blocked isocyanate was formed. The resulting blocked MDI solution had a solids content of 63.7%.

A microgel was prepared by charging the following constituents into a reactor equipped with a reflux condenser, heat source, a stirrer and a thermometer:

|  | Parts by Weight |
| --- | --- |
| Portion 1 | |
| Epon 828 ® - epoxy resin of diglycidyl ether of Bisphenol A from Shell Chemical Company having an equivalent weight of 188 | 1577.1 |
| Bisphenol A | 548.2 |
| Tone 200 ® - polycaprolactone diol weight ave. MW 200 | 323.7 |
| Xylene | 122.4 |
| Dimethyl benzyl amine catalyst | 7.7 |
| Portion 2 | |
| Methyl isobutyl ketone | 927.9 |
| Diketamine | 475.8 |
| Diethanolamine | 111.3 |
| Portion 3 | |
| Blocked MDI solution (prepared above) | 1140.8 |
| Portion 4 | |
| Lactic acid | 328.8 |
| Surfactant - 120 parts Amine C ® from Ciba Geigy Inc., 120 parts acetylenic alcohol available as Surfynol 104 ® from Air Products | 81.0 |

|  | Parts by Weight |
| --- | --- |
| and Chemicals, Inc., 120 parts of 1-butoxy ethanol, 221 parts of deionized water and 19 parts glacial acetic acid | |
| Deionized water | 18167.5 |
| Total | 23812.2 |

Portion 1 was charged into the reaction vessel heated to about 143.3° C. under a blanket of nitrogen with constant stirring. An exothermic reaction occurred and the temperature rose to about 201.6° C. The reaction mixture was held at about 171.1° C. for about 75 minutes. The resulting the epoxy resin was extended and has an epoxy equivalent weight of about 1037.7. The reaction mixture was cooled to about 121.1° C. and the viscosity was reduced by adding the methyl isobutyl ketone of Portion 2. The reaction mixture cooled to about 87.7° C. and the diketamine and diethanolamine of Portion 2 were added and the reaction mixture was held for 60 minutes. The reaction mixture was cooled to 76.6° C. and Portion 3 was added with stirring and held for about 5 minutes. Portion 4 was premixed and charged into a mixer and the above prepared reaction mixture was added using sufficient shear to form a good emulsion. The resulting emulsion was heated to about 76.6° C. and agitated for about 6 hours to allow for the formation of microgel particles and crosslinking to occur in the microparticles.

The resulting microgel emulsion had a solids content of about 21.6%. 46.9% of the microgel particles are insoluble crosslinked microparticles determined by a 7 hour extraction by refluxing tetrahydrofuran. The particle size of the emulsion was determined as described above and was 0.188 microns.

Example 3

An electrocoating composition was prepared according to Example 1 of U.S. Pat. No. 5,070,149 and then the following electrocoating baths 1-3 were formulated with the with each of the microgels prepared in Examples 1 and 2:

| Electrocoating Bath | % Microgel | Corrosion Test - Number of Rust Spots |
| --- | --- | --- |
| Bath No. 1 | Control (0%) Microgel | 126 |
| Bath No. 2 | 8.8% Microgel (Ex. 1) | 6 |
| Bath No. 3 | 11.4% Microgel (Ex. 2) | 3 |

In the corrosion test used above, three separate sets of razor blades (10×2 cm with 38° blade angle) were electrocoated at 215 volts in each bath and the coating was baked at about 182.2° C. for 17 minutes to provide a coating having a dry film build of 20.7 microns. Each of the razor blades was exposed 150 hours to a standard salt spray test and the rust spots on each of the blades was counted using 10× magnification stereo microscope and averaged for each set of three blades and the results are set forth above in the table.

The test results showed that there was a significant improvement in corrosion resistance for each of the baths containing the microgel in comparison to the control that did not contain microgel.

I claim:

1. A cationic finely divided polymeric microgel dispersed in an aqueous medium for use in cationic electrocoating compositions comprising a poly epoxy-amine reaction product having reactive amine and hydroxyl groups which consists essentially of the reaction product of a poly epoxy hydroxy ether resin and an amine compound selected from the group consisting of ketimines, primary amines, secondary amines or any mixtures thereof: said poly epoxy amine reaction product being reacted with an oxime blocked polyisocyanate under temperature conditions sufficient to deblock isocyanate groups of the polyisocyanate; wherein the isocyanate groups of the de blocked polyisocyanate react with the amine groups and the hydroxy groups of the reaction product to form a crosslinked microgel; cationic water dispersible groups being attached to the microgel being formed by neutralization of residual amine groups of the microgel with an organic acid.

2. The microgel of claim 1 in which the poly epoxy hydroxy ether resin is a diglycidyl ether of a polyphenol extended with a polyol or polyether.

3. The microgel of claim 1 in which the poly epoxy polymer is a linear epoxy hydroxy functional polymer containing segments of alkyl acrylate, alkyl methacrylate or mixtures thereof or urethane segments.

4. The microgel of claim 1 in which the polyepoxy polymer is a branched aromatic or aliphatic epoxy hydroxy functional polymer containing segments of alky acrylate, alkyl methacrylate or mixtures thereof or urethane segments.

5. The microgel of claim 1 in which the amine compound is mixture of diketimine and an alkanol amine.

6. The microgel of claim 5 in which the polyisocyanate is an aromatic diisocyante and the oxime is selected from the group of acetone oxime, methylethyl ketoxime and methylpropyl ketoxime.

7. An aqueous cationic electrocoating composition having a film forming binder of a basic polyepoxide/amine adduct resin containing amino groups and hydroxyl groups capable of reaction with isocyanate groups and a blocked polyisocyanate crosslinking agent containing about 10–40% by weight, based on the weight of the binder, of the microgel of claim 1.

8. A process for forming a stable aqueous dispersion of a crosslinked microgel which comprises the following steps:
   (1) reacting a poly epoxy hydroxy ether resin with an amine compound selected from the group consisting of ketimines, primary amines, secondary amines or mixtures thereof to form a polyepoxy amine reaction product having reactive amine and hydroxy groups; and
   (2) mixing the poly epoxy amine reaction product formed in step (1) with an oxime blocked polyisocyanate and with an organic acid in water and reacting the resulting mixture under temperature conditions sufficient to unblock isocyanate groups of the blocked polyisocyanate; wherein the isocyanate groups of the unblocked polyisocyanate react with the amine groups and the hydroxy groups of the poly epoxy amine reaction product to form a crosslinked microgel and the organic acid neutralizes a portion of the amine and hydroxy groups of the poly epoxy amine reaction product to form cationic groups thereby forming an aqueous dispersion of crosslinked microgel.

9. The process of claim 8 in which the poly epoxy hydroxy ether resin is a diglycidyl ether of a polyphenol extended with a polyol or polyether.

10. The process of claim 8 in which the poly epoxy polymer is a linear epoxy hydroxy functional polymer containing segments of alkyl acrylate, alkyl methacrylate or mixtures thereof or urethane segments.

11. The process of claim 8 in which the polyepoxy polymer is a branched aromatic or aliphatic epoxy hydroxy functional polymer containing segments of alky acrylate, alkyl methacrylate or mixtures thereof or urethane segments.

12. The process of claim 9 in which the amine compound is mixture of diketimine and an alkanol amine.

13. The process of claim 9 in which the polyisocyanate is an aromatic diisocyante and the oxime is selected from the group of acetone oxime, methylethyl ketoxime and methylpropyl ketoxime.

* * * * *